(12) United States Patent
Akulov

(10) Patent No.: US 11,120,096 B2
(45) Date of Patent: Sep. 14, 2021

(54) METHOD AND SYSTEM FOR GENERATING AN OBJECT CARD

(71) Applicant: YANDEX EUROPE AG, Lucerne (CH)

(72) Inventor: Yaroslav Viktorovich Akulov, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 186 days.

(21) Appl. No.: 16/567,484

(22) Filed: Sep. 11, 2019

(65) Prior Publication Data

US 2020/0192949 A1 Jun. 18, 2020

(30) Foreign Application Priority Data

Dec. 13, 2018 (RU) .......................... RU2018144179

(51) Int. Cl.
| | |
|---|---|
| *G06F 16/957* | (2019.01) |
| *G06N 20/00* | (2019.01) |
| *G06F 16/958* | (2019.01) |
| *G06F 16/9535* | (2019.01) |
| *G06N 3/08* | (2006.01) |

(52) U.S. Cl.
CPC ........ *G06F 16/957* (2019.01); *G06F 16/9535* (2019.01); *G06F 16/972* (2019.01); *G06N 3/08* (2013.01); *G06N 20/00* (2019.01)

(58) Field of Classification Search
CPC .. G06F 16/957; G06F 16/9535; G06F 16/972; G06N 20/00; G06N 3/08
USPC ...................................................... 707/734
See application file for complete search history.

(56) References Cited

U.S. PATENT DOCUMENTS

| | | |
|---|---|---|
| 2008/0040322 A1 | 2/2008 | Rucker et al. |
| 2011/0320437 A1 | 12/2011 | Kim et al. |
| 2013/0158981 A1 | 6/2013 | Ceylan et al. |
| 2015/0186531 A1 | 7/2015 | Agarwal et al. |
| 2016/0070742 A1 | 3/2016 | Myslinski |
| 2017/0010790 A1* | 1/2017 | Glover ................ G06F 16/9537 |
| 2017/0099242 A1 | 4/2017 | Gupta |

(Continued)

FOREIGN PATENT DOCUMENTS

CN 106649780 A 5/2017

OTHER PUBLICATIONS

English Abstract for CN106649780 retrieved on Espacenet on Jun. 26, 2019.

(Continued)

*Primary Examiner* — Evan Aspinwall
(74) *Attorney, Agent, or Firm* — BCF LLP

(57) ABSTRACT

A method and a system for generating an object card are disclosed. The method comprises receiving a request for a digital news article; retrieving the digital news article; and identifying an object contained therein. A set of object features associated with the object is determined, and a score value for the object is generated. The score value is representative of a likelihood of the user executing a web search to locate additional information in respect to the object. In response to the score value being above a predetermined threshold, an object card is generated. The object card and the digital news article are then transmitted to the electronic device for display.

21 Claims, 10 Drawing Sheets

(56) References Cited

U.S. PATENT DOCUMENTS

2018/0181628 A1* 6/2018 Lin ................. G06F 16/248
2020/0073953 A1* 3/2020 Kulkarni ........... G06F 16/248

OTHER PUBLICATIONS

Yang et al., "Modeling User Interests for Zero-Query Ranking", Conference Paper, 2016, 13 pages.

* cited by examiner

| No. | Unique browser ID 606 | |
|---|---|---|
| | Set of URLs 604 | Access time 602 |
| 1. | www.aaaa.com | 2017-05-19 8:23:56 |
| 2. | www.bbb.com | 2017-05-19 8:25:01 |
| 3. | www.ccc.com | 2017-05-19 8:28:45 |
| 4. | www.ddd.com | 2017-05-19 8:30:27 |
| 5. | www.eee.com | 2017-05-19 12:59:37 |
| 6. | www.fff.com | 2017-05-19 13:01:55 |
| 7. | www.ggg.com | 2017-05-19 14:30:02 |
| 8. | www.hhh.com | 2017-05-19 19:01:15 |
| 9. | www.iii.com | 2017-05-19 19:01:55 |
| 10. | www.jjj.com | 2017-05-19 19:03:45 |
| 11. | www.kkk.com | 2017-05-19 19:05:25 |
| 12. | www.lll.com | 2017-05-20 6:23:45 |
| 13. | www.mmm.com | 2017-05-20 6:28:21 |
| 14. | www.nnn.com | 2017-05-20 6:28:45 |
| 15. | www.ooo.com | 2017-05-20 6:32:26 |

| First navigational Session | | *802* |
|---|---|---|
| 1. | www.aaaa.com  *804* | 2017-05-19 8:23:56 |
| 2. | www.bbb.com  *806* | 2017-05-19 8:25:01 |
| 3. | www.ccc.com  *808* | 2017-05-19 8:28:45 |
| 4. | www.ddd.com  *810* | 2017-05-19 8:30:27 |

| Second navigational Session | | *812* |
|---|---|---|
| 5. | www.eee.com | 2017-05-19 12:59:37 |
| 6. | www.fff.com | 2017-05-19 13:01:55 |

| Third navigational Session | | *814* |
|---|---|---|
| 7. | www.ggg.com | 2017-05-19 14:30:02 |

| Fourth navigational Session | | *816* |
|---|---|---|
| 8. | www.hhh.com | 2017-05-19 19:01:15 |
| 9. | www.iii.com | 2017-05-19 19:01:55 |
| 10. | www.jjj.com | 2017-05-19 19:03:45 |
| 11. | www.kkk.com | 2017-05-19 19:05:25 |

| Fifth navigational Session | | *818* |
|---|---|---|
| 12. | www.lll.com | 2017-05-20 6:23:45 |
| 13. | www.mmm.com | 2017-05-20 6:28:21 |
| 14. | www.nnn.com | 2017-05-20 6:28:45 |

Fig. 8

METHOD AND SYSTEM FOR GENERATING AN OBJECT CARD

CROSS-REFERENCE

The present application claims priority to Russian Patent Application No. 2018144179, filed Dec. 13, 2018, entitled "Method and System for Generating an Object Card", the entirety of which is incorporated herein.

FIELD

The present technology relates to recommendation systems in general and specifically to a method and a system for generating an object card.

BACKGROUND

Various global or local communication networks (the Internet, the World Wide Web, local area networks and the like) offer a user a vast amount of information. The information includes a multitude of contextual topics, such as but not limited to, news and current affairs, maps, company information, financial information and resources, traffic information, games and entertainment-related information. Users use a variety of client devices (desktop, laptop, notebook, smartphone, tablets and the like) to have access to rich content (like images, audio, video, animation, and other multimedia content from such networks).

The volume of available information through various Internet resources has grown exponentially in the past couple of years. Several solutions have been developed in order to allow a typical user to find the information that the user is looking for. One example of such a solution is a search engine. Examples of search engines include GOOGLE™ search engine, YANDEX™ search engine, YAHOO!™ search engine and the like. The user can access the search engine interface and submit a search query associated with the information that the user is desirous of locating on the Internet. In response to the search query, the search engine provides a ranked list of search results. The ranked list of search results is generated based on various ranking algorithms employed by the particular search engine that is being used by the user performing the search. The overall goal of such ranking algorithms is to present the most relevant search results at the top of the ranked list, while less relevant search results would be positioned on less prominent positions of the ranked list of search results (with the least relevant search results being located towards the bottom of the ranked list of search results).

The search engines typically provide a good search tool for a search query that the user knows a priori that she/he wants to search. In other words, if the user is interested in obtaining information about the most popular destinations in Italy (i.e. a known search topic), the user could submit a search query: "The most popular destinations in Spain?" The search engine will then present a ranked list of Internet resources that are potentially relevant to the search query. The user can then browse the ranked list of search results in order to obtain information she/he is interested in as it related to places to visit in Spain. If the user, for whatever reason, is not satisfied with the uncovered search results, the user can rerun the search, for example, with a more focused search query, such as "The most popular destinations in Spain in the summer?", "The most popular destinations in the South of Spain?", "The most popular destinations for a culinary getaway in Spain?".

There is another approach that has been proposed for allowing the user to discover content and, more precisely, to allow for the user to be kept with up-to-date events. For example, news aggregator service (such as Yandex.News™) has been particularly useful in allowing users to easily view news articles on a single platform.

Digital news aggregation is a technology area of growing interests. Indeed, news is a very important part of the daily life, whether for a stock broker, a lawyer or an aspiring politician. News aggregation service allows the user to be exposed to the most current news, without the need of frequently visiting many separate websites (such as those associated with individual news agencies or individual newspapers) to see if the content has been updated.

More than often, a user reading a particular news article is desirous of knowing more about an object (such as a person that is mentioned) in the news article. Conventionally, in order for the user to know more about the object, would be required to exit the webpage associated with the news article and execute a search about the object. Needless to say, not only this approach tedious, it also takes both human and computational resources.

United States Patent Application Publication No. 2016/0070742 A1 published on Mar. 10, 2016 to Myslinski L., and titled "Optimized Narrative Generation and Fact Checking Method and System Based on Language usage" teaches a optimized fact checking system that analyzes and determines the factual accuracy of information and/or characterizes the information by comparing the information with source information. The optimized fact checking system automatically monitors information, processes the information, fact checks the information in an optimized manner and/or provides a status of the information. In some embodiments, the optimized fact checking system generates, aggregates, and/or summarizes content.

United States Patent Application Publication No. 2011/0320437A1 published on Dec. 29, 2011 to Yahoo! Inc., and titled "Infinite Browse" teaches an online article that is enhanced by displaying, in association with the article, supplemental content that includes entities that are extracted from the article and/or entities that are related to entities that are extracted from the article. The supplemental content further includes information about each of the entities. The information about an entity may be obtained by searching for the entity in one or more searchable repositories of data. For example, the supplemental content may include, for each entity, video, image, web, and/or news search results. The supplemental content may further include information such as stock quotes, abstracts, maps, scores, and so on. The entities are selected using a variety of analyses and ranking techniques based on contextual factors such as user-specific information, time-sensitive popularity trends, grammatical features, search result quality, and so on. The entities may further be selected for purposes such as generating ad-based revenue.

Chinese Patent Application Publication No. 106649780A published on May 10, 2017 to Beijing Baidu Netcom Science and Technology Co., Ltd., and titled "Information Providing Method and Device Based on Artificial Intelligence" teaches an information providing method and device based on artificial intelligence. The method comprises the steps of determining interest features of a user according to historical access records of the user; displaying an information card which is matched with the interest features to the user in an information displaying interface, wherein the information card comprises core content of news which are determined after conducting analysis on news in the database and are matched with the interest features. Thereby, the purpose that the user can directly obtain the core content of the news which the user is interested in is achieved, the operation of the user is reduced, the time of the user is saved, the information obtaining efficiency of the user is improved, the flow of using the application of the user is reduced, and the cost of the user is saved.

SUMMARY

It is an object of the present technology to provide improved method and systems for generating an object card.

Without wishing to be bound to any specific theory, embodiments of the present technology have been developed based on an assumption that by analyzing the relationship between objects that have been additionally searched following the view of an article by a user and its characteristics, it is possible to predict how likely a given object provided in a news article would be subject to additional searches. As such, embodiments of the present technology are based on the premise that a search engine server has access to wealth of information representative of past users' searches. As such, by allowing the news aggregator service to have access to past browsing history and search history associated with one or more electronic devices, it is possible to predict the likelihood of the execution of additional searches of a given object by a user. Broadly speaking, a Machine Learning Algorithm (MLA) is trained, based on a training set, to predict a likelihood of the user executing a search in regard to the given object, which likelihood is indicative of the need/usefulness of showing an object card associated with the given object. The training set of training the MLA is generated by analyzing past sessions, where based on a co-occurrence of the user accessing a news article with the given object and user executing a search with the given object as a search term within a pre-determined time interval therebetween (such as within the same browsing session, for example), the training set is generated by adding the given object and a label indicative of usefulness of showing the object card.

In accordance with a first broad aspect of the present technology, there is provided a method for generating an object card. The method is executed by a server connectable to an electronic device associated with a user via a communication network. The server is further coupled to: a source of a plurality of digital news articles, an object database, the object database hosting an indication of a plurality of objects and information data associated with each of the plurality of objects. The method comprising: receiving, from the electronic device, a request for a digital news article; retrieving the digital news article, the digital news article having a corpus of text; parsing the corpus of text to identify an object contained therein, the object corresponding to one of the plurality of objects; determining, for the object, a set of object features, the set of object features comprising a set of statistical features being indicative of a statistical characteristic of the object within at least one of the digital news article and the plurality of digital news articles; generating, by a machine learning algorithm (MLA), a score value for the object, the score value being representative of a likelihood of the user executing a web search to locate additional information in respect to the object; in response to the score value being above a predetermined threshold, generating an object card, the object card comprising the object and the associate information data; and transmitting the object card and the digital news article to the electronic device for displaying the object card in association with the digital news article.

In some embodiments of the method, the MLA is a neural network; and the method further comprises training the neural network using a training set of data prior to receiving the request for the digital news article.

In some embodiments of the method, the server is further coupled to: a browsing log, the browsing log storing an indication of a plurality of navigational session transition patterns, each of the navigational session transition patterns having one or more web pages accessed by a given electronic device; and the training sets of data comprising at least: a training set of object features associated with a training object; a label associated with the training object, the label being indicative of a number of navigational session transition patterns, each of the navigational session transition patterns comprising a first web page associated with a training digital news article comprising the training object, and a second web page associated with a search engine result page comprising the training object as a search term.

In some embodiments of the method, the training set of object features comprises a training set of statistical features being indicative of the statistical characteristics of the training object within at least one of the digital news article and the plurality of digital news articles; and the label comprises a ratio of the number of navigational session transition patterns with regards to the plurality of navigational session transition patterns.

In some embodiments of the method, the first web page and the second web page have been accessed within a pre-determined time period within each of the number of navigational session transition patterns.

In some embodiments of the method, the training the neural network comprises: inputting the training set of object features associated with the training object as an input data; inputting the label associated with the training object; determining, for the set of object features and the label, a set of features representative of a property of the training object; and based on the set of features of the training object, learning a training score value, the training score value being indicative of one of a higher degree of likelihood or a lower degree of likelihood of the user executing a web search to locate additional information in respect to the training object after being exposed to the training article.

In some embodiments, the electronic device is associated with a user ID; each of the number of navigational session transition patterns is associated with the user ID; and the score value being representative of a respective likelihood of the user associated with the electronic device executing the web search to locate additional information in respect to the object.

In some embodiments, the set of statistical features comprises at least one of: a number of occurrence of the indication of the object within the digital news article; a size of the corpus of text; an average number of objects present in each of the plurality of digital news articles; a profile associated with the object; and the set of object features further comprises at least one of: a set of profile features associated with the object, the profile feature being a set of vectors representing the profile of the text object; and a popularity feature, the popularity feature being indicative of a popularity of the object as a search term in a search engine service.

In some embodiments, the set of profile features are generated by analyzing a webpage associated with the object (such as, for example, a Wikipedia article or the like); and the popularity feature are generated by analyzing one of a search history log and a vertical search history log associated with the search engine service.

In some embodiments, the method further comprises: parsing the plurality of digital news articles by topic; identifying a subset of the plurality of digital news articles sharing a same topic with the digital news article; and wherein the set of object features of the object further comprises at least one of: a number of digital news articles within the subset comprising the object.

In some embodiments, the information data is at least one of an image, a text, and a video.

In accordance with another broad aspect of the present technology, there is provided a system for generating an object card. The system comprises a server connectable to an electronic device associated with a user via a communication network; a source of a plurality of digital news articles; and an object database hosting an indication of a plurality of objects and information data associated with each of the plurality of objects. The server comprises a processor configured to: receive, from the electronic device, a request for a digital news article; retrieve the digital news article, the digital news article having a corpus of text; parse the corpus of text to identify an object contained therein, the object corresponding to one of the plurality of objects; determine, for the object, a set of object features, the set of object features comprising a set of statistical features being indicative of a statistical characteristic of the object within at least one of the digital news article; and the plurality of digital news articles; generate, by a machine learning algorithm (MLA), a score value for the object, the score value being representative of a likelihood of the user executing a web search to locate additional information in respect to the object; in response to the score value being above a predetermined threshold, generate an object card, the object card comprising the object and the associate information data; and transmit the object card and the digital news article to the electronic device for displaying the object card in association with the digital news article.

In some embodiments, the MLA is a neural network; and the processor is further configured to train the neural network using a training set of data prior to receiving the request for the digital news article.

In some embodiments, the server is further coupled to: a browsing log, the browsing log storing an indication of a plurality of navigational session transition patterns, each of the navigational session transition patterns having one or more web pages accessed by a given electronic device; and the training sets of data comprising at least: a training set of object features associated with a training object; and a label associated with the training object, the label being indicative of a number of navigational session transition patterns, each of the navigational session transition patterns comprising a first web page associated with a training digital news article comprising the training object, and a second web page associated with a search engine result page comprising the training object as a search term.

In some embodiments, the training set of object features comprises a training set of statistical features being indicative of the statistical characteristics of the training object within at least one of the digital news article and the plurality of digital news articles; and the label comprises a ratio of the number of navigational session transition patterns with regards to the plurality of navigational session transition patterns.

In some embodiments, the first web page and the second web page have been accessed within a pre-determined time period within each of the number of navigational session transition patterns.

In some embodiments, to train the neural network, the processor is configured to: input the training set of object features associated with the training object as an input data; input the label associated with the training object; determining, for the set of object features and the label, a set of features representative of a property of the training object; and based on the set of features of the training object, learn a training score value, the training score value being indicative of one of a higher degree of likelihood or a lower degree of likelihood of the user executing a web search to locate additional information in respect to the training object after being exposed to the training article.

In some embodiments, the electronic device is associated with a user ID; each of the number of navigational session transition patterns is associated with the user ID; and the score value being representative of a respective likelihood of the user associated with the electronic device executing the web search to locate additional information in respect to the object.

In some embodiments, the set of statistical features comprises at least one of: a number of occurrence of the indication of the object within the digital news article; a size of the corpus of text; an average number of objects present in each of the plurality of digital news articles; a profile associated with the object; and the set of object features further comprises at least one of: a set of profile features associated with the object, the profile feature being a set of vectors representing the profile of the text object; and a popularity feature, the popularity feature being indicative of a popularity of the object as a search term in a search engine service.

In some embodiments, the set of profile features being generated by analyzing a webpage associated with the object; and the popularity feature being generated by analyzing one of a search history log and a vertical search history log associated with the search engine service.

In some embodiments, the processor is further configured to: parse the plurality of digital news articles by topic; identify a subset of the plurality of digital news articles sharing a same topic with the digital news article; and wherein the set of object features of the object further comprises at least one of: a number of digital news articles within the subset comprising the object.

In some embodiments, the information data is at least one of: an image, a text, and a video.

DESCRIPTION OF THE DRAWINGS

For a better understanding of the present technology, as well as other aspects and further features thereof, reference is made to the following description which is to be used in conjunction with the accompanying drawings, where:

FIG. 8 depicts a schematic illustration of a parsed navigation history data by the news aggregator application of the system of FIG. 1.

DETAILED DESCRIPTION

Figure 1:
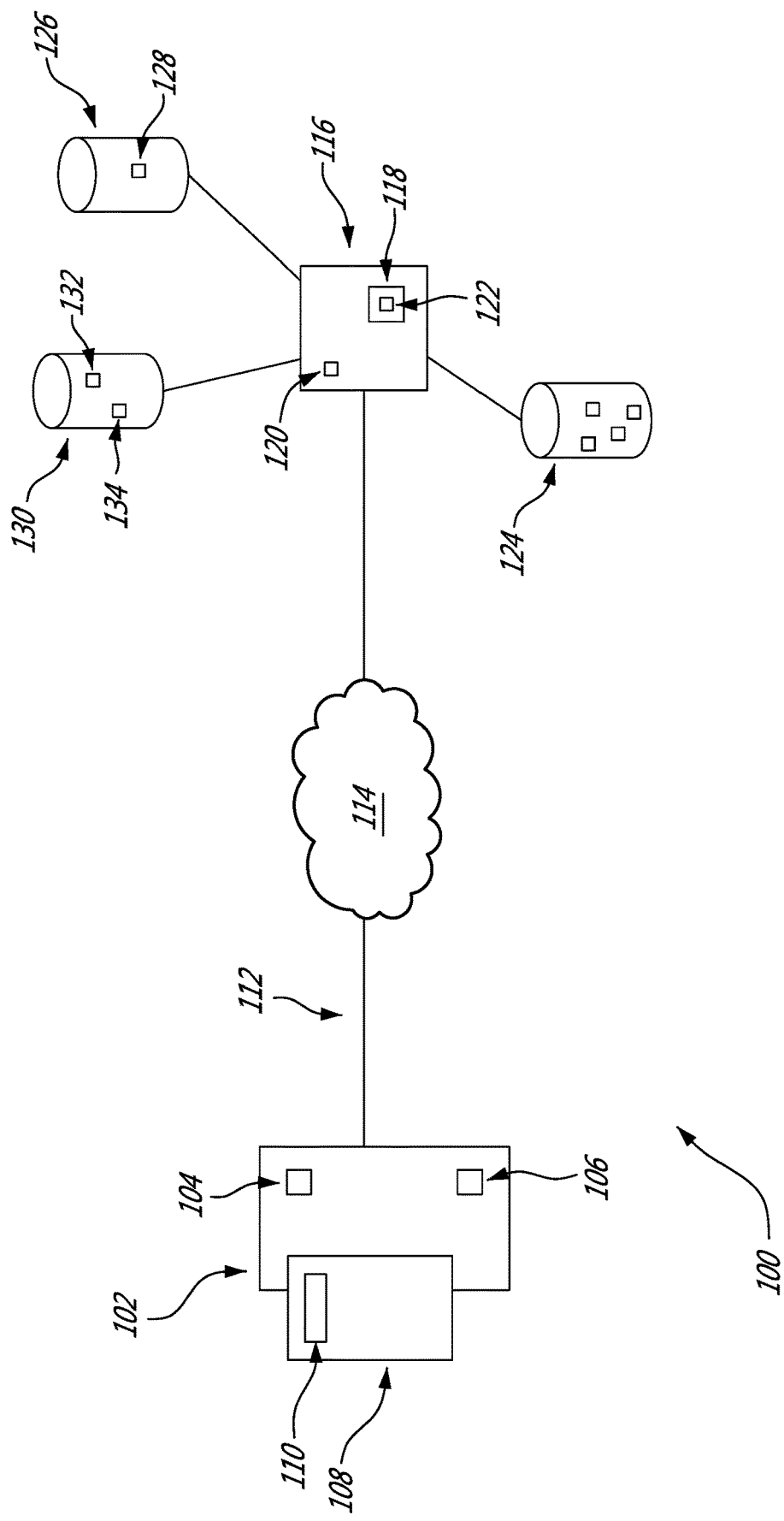
FIG. 1 depicts a schematic diagram of a system implemented in accordance with non-limiting embodiments of the present technology.

Referring to FIG. 1, there is shown a schematic diagram of a system 100, the system 100 being suitable for implementing non-limiting embodiments of the present technology. It is to be expressly understood that the system 100 is depicted merely as an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 100 may provide in certain instances simple implementations of the present technology, and that where such is the case they have been presented in this manner as an aid to understanding. As persons skilled in the art would understand, various implementations of the present technology may be of a greater complexity.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope. Furthermore, as an aid to understanding, the following description may describe relatively simplified implementations of the present technology. As persons skilled in the art would understand, various implementations of the present technology may be of greater complexity.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labelled as a "processor" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

With these fundamentals in place, we will now consider some non-limiting examples to illustrate various implementations of aspects of the present technology.

The system 100 comprises an electronic device 102. The electronic device 102 is typically associated with a user (not depicted) and, as such, can sometimes be referred to as a "client device". It should be noted that the fact that the electronic device 102 is associated with the user does not mean to suggest or imply any mode of operation—such as a need to log in, a need to be registered or the like.

In the context of the present specification, unless provided expressly otherwise, "electronic device" is any computer hardware that is capable of running a software appropriate to the relevant task at hand. Thus, some (non-limiting) examples of electronic devices include personal computers (desktops, laptops, netbooks, etc.), smartphones, and tablets, as well as network equipment such as routers, switches, and gateways. It should be noted that a device acting as an electronic device in the present context is not precluded from acting as a server to other electronic devices. The use of the expression "an electronic device" does not preclude multiple client devices being used in receiving/sending, carrying out or causing to be carried out any task or request, or the consequences of any task or request, or steps of any method described herein.

The electronic device 102 comprises a permanent storage 104. The permanent storage 104 may encompass one or more storage media and generally provides a place to store computer-executable instructions executable by a processor 106. By way of an example, the permanent storage 104 may be implemented as a computer-readable storage medium including Read-Only Memory (ROM), hard disk drives (HDDs), solid-state drives (SSDs), and flash-memory cards.

The electronic device 102 comprises hardware and/or software and/or firmware (or a combination thereof), as is known in the art to execute a browser application 108. Generally speaking, the purpose of a browser application 108 is to enable the user (not depicted) to access one or more web resources. The manner in which the browser application 108 is implemented is known in the art and will not be described herein. Suffice to say that the browser application 108 may be one of Google™ Chrome™, Yandex.Browser™, or other commercial or proprietary browsers.

Irrespective of how the browser application 108 is implemented, the browser application 108, typically, has a command interface 110. Generally speaking, the user (not depicted) can access a web resource via a communication network by two principle means. The given user can access a particular web resource directly, either by typing an address of the web resource (typically an URL or Universal Resource Locator, such as www.example.com) into the command interface 110 or by clicking a link in an e-mail or in another web resource (which action will in a sense "copy and paste" the URL associated with the link into the command interface 110).

Alternatively, the given user may conduct a search using a search engine service (not depicted) to locate a resource of interest based on the user's search intent. The latter is particularly suitable in those circumstances, where the given user knows a topic of interest, but does not know the URL of the web resource she is interested in. The search engine typically returns a Search Engine Result Page (SERP) containing links to one or more web resources that are responsive to the user query. Again, upon the user clicking one or more links provided within the SERP, the user can open the required web resource.

The electronic device 102 comprises a communication interface (not depicted) for two-way communication with a communication network 114 via a communication link 112. In some non-limiting embodiments of the present technology, the communication network 114 can be implemented as the Internet. In other embodiments of the present technology, the communication network 114 can be implemented differently, such as any wide-area communication network, local area communications network, a private communications network and the like.

How the communication link 112 is implemented is not particularly limited and depends on how the electronic device 102 is implemented. Merely as an example and not as a limitation, in those embodiments of the present technology where the electronic device 102 is implemented as a wireless communication device (such as a smart phone), the communication link 112 can be implemented as a wireless communication link (such as, but not limited to, a 3G communications network link, a 4G communications network link, a Wireless Fidelity, or WiFi®, for short, Bluetooth®, or the like) or wired (such as an Ethernet based connection).

It should be expressly understood that implementations for the electronic device 102, the communication link 112 and the communication network 114 are provided for illustration purposes only. As such, those skilled in the art will easily appreciate other specific implementational details for the electronic device 102, the communication link 112, and the communication network 114. As such, by no means the examples provided hereinabove are meant to limit the scope of the present technology.

The system 100 further includes a server 116 coupled to the communication network 114. The server 116 can be implemented as a conventional computer server. In an example of an embodiment of the present technology, the server 116 can be implemented as a Dell™ PowerEdge™ Server running the Microsoft™ Windows Server™ operating system. Needless to say, the server 116 can be implemented in any other suitable hardware and/or software and/or firmware or a combination thereof. In the depicted non-limiting embodiment of the present technology, the server 116 is a single server. In alternative non-limiting embodiments of the present technology, the functionality of the server 116 may be distributed and may be implemented via multiple servers.

The server 116 comprises a communication interface (not depicted) structured and configured to communicate with various entities (such as the electronic device 102 and other devices potentially coupled to the communication network 114) via the communication network 114. The server 116 comprises a server memory 118 which comprises one or more storage media and generally provides a place to store computer-executable program instructions executable by a server processor 120. By way of example, the server memory 118 may be implemented as a tangible computer-readable storage medium including Read-Only Memory (ROM) and/or Random-Access Memory (RAM). The server memory 118 may also include one or more fixed storage devices in the form of, by way of example, hard disk drives (HDDs), solid-state drives (SSDs), and flash-memory cards.

In some embodiments, the server 116 can be operated by the same entity that has provided the afore-described browser application 108. For example, if the browser application 108 is a Yandex.Browser™, the server 116 can be operated by Yandex LLC of Lev Tolstoy Street, No. 16, Moscow, 119021, Russia. In alternative embodiments, the server 116 can be operated by an entity different from the one who has provided the aforementioned browser application 108.

In accordance with the present technology, the server 116 is configured to execute a news aggregator application 122, such as Yandex.News™. The manner in which the news aggregator application 122 is implemented is described in detail below. For now, suffice it to say that the news aggregator application 122 is configured to provide a news aggregator service that is accessible by the electronic device 102 via the communication network 114 to provide news content from multiple sources (not depicted).

To that end, the server 116 is communicatively coupled to a news database 124 via a dedicated link (not numbered). In alternative implementations, the news database 124 may be communicatively coupled to the server 116 via the communication network 114 without departing from the teachings of the present technology. Although the news database 124 is illustrated schematically herein as a single entity, it is contemplated that the news database 124 may be configured in a distributed manner.

The news database 124 is populated with a plurality of digital documents (not separately numbered). The nature of each of the plurality of digital documents is not particularly limited. Broadly speaking, a given one of the one or more digital documents contains one or more sentences, images, videos, etc. The digital document can be, for example a news article (such as, for example a CNN™ article about current world politics).

News Database 124

Figure 2:
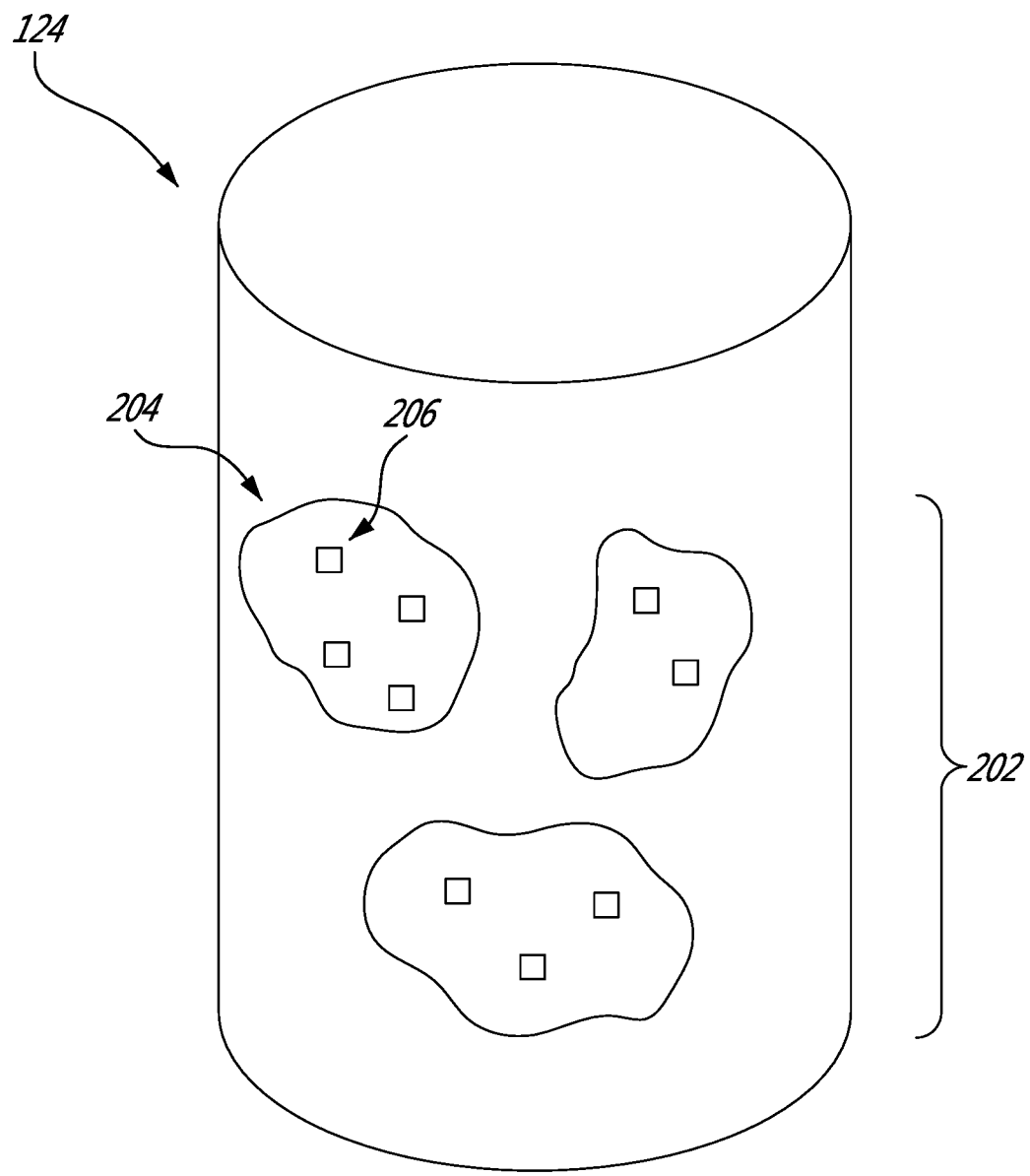
FIG. 2 depicts a schematic illustration of the news database of the system of FIG. 1.

With reference to FIG. 2, a non-limiting embodiment of the news database 124 populated with the plurality of digital documents is illustrated.

The manner in which the news database 124 is populated is not limited. Just as an example, the news database 124 may be coupled to a crawling function configured to gather the plurality of digital documents from selected news sources, such as websites of newspapers, online magazines, other electronic news resources, etc. Alternatively, the news database 124 may receive the plurality of digital documents directly from various sources, without the use of a crawling function.

The news database 124 stores the plurality of digital documents clustered into one or more topics or events. As such, the news database 124 has access to a topic clustering function (not illustrated). The manner in which the plurality of digital documents are clustered into one or more topics or events is not limited, and may for example, be done using conventional clustering techniques, such as topic modelling or key word-based approaches.

The plurality of digital documents is clustered into one or more topic clusters 202. For example, the news database 124 stores a first topic cluster 204, a second topic cluster (not numbered) and a third topic cluster (not numbered). The first topic cluster 204 includes a digital document 206.

Digital Document

Figure 3:
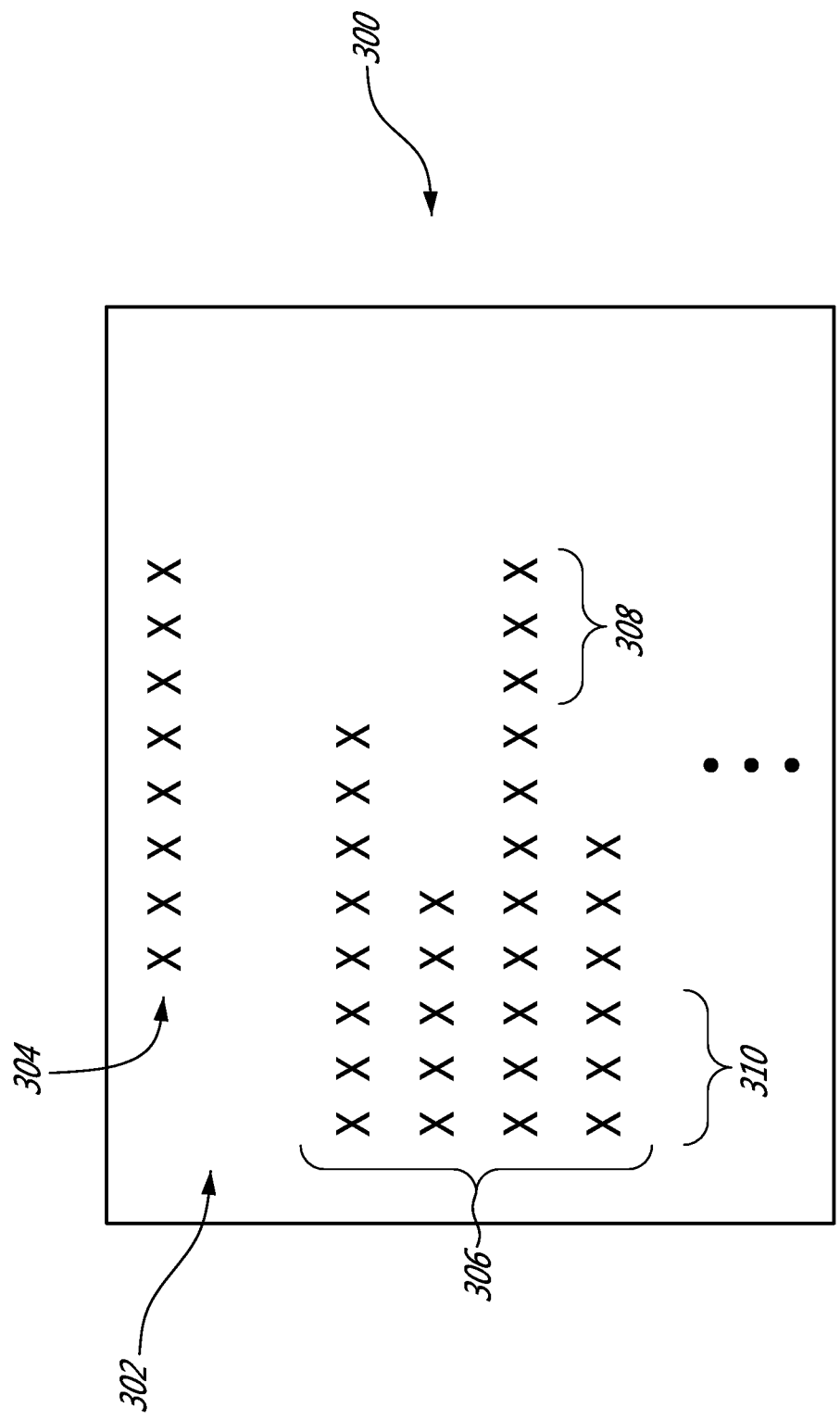
FIG. 3 depicts a screenshot of a digital document stored within a news database of the system of FIG. 1.

Attention is briefly directed to FIG. 3, which illustrates a screenshot 300 of the digital document 206, displaying a digital text 302. The digital text 302 can be, for example, a version of the digital document 206, rendered on an output device of the electronic device 102, in response to the browser application 108 accessing the digital document 206 via the news aggregator application 122. Although the output device is not depicted, it can be implemented as a screen, a monitor, a touch-screen or the like. In some embodiments, the news article is a natural language text written in a language.

The digital text 302 includes a title 304 and a corpus of text, the corpus of text being made up of a plurality of sentences 306. For the avoidance of any doubt, it should be mentioned that the digital text 302 (and more specifically each letter), is represented by an "X", however, in reality the individual sentences are made of words in a given language (such as English).

Although only a screenshot of the digital document 206 is illustrated, it should be understood that each of the plurality of digital documents stored within the news database 124 also comprises their respective digital texts.

Referring back to FIG. 1, the server 116 is further coupled to an object database 126 via a dedicated link (not numbered). In alternative implementations, the object database 126 may be communicatively coupled to the server 116 via the communication network 114 without departing from the teachings of the present technology. Although the object database 126 is illustrated schematically herein as a single entity, it is contemplated that the object database 126 may be configured in a distributed manner.

The object database 126 acts as a repository of an index 128.

Figure 4:
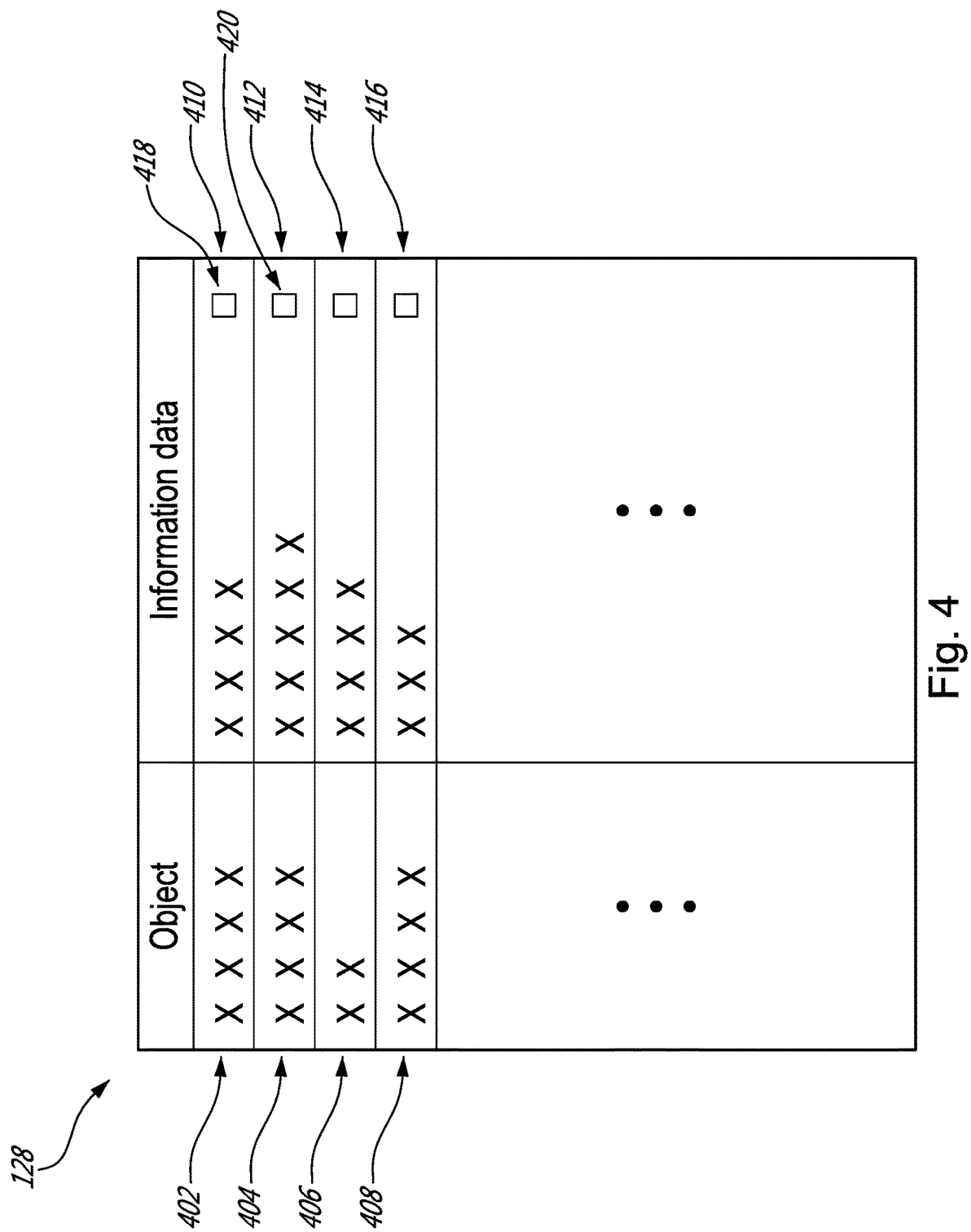
FIG. 4 depicts a schematic illustration of an index of an object database of the system of FIG. 1.

With brief reference to FIG. 4, there is provided a non limiting example of the index 128 populated with a plurality of objects and information data (described below).

In the illustrated example, the index 128 comprises four objects, namely a first object 402, a second object 404, a third object 406 and a fourth object 408. Each of the objects is a word, term or phrase associated with an entity, such as a person, location, object, event and the like. For example, the first object 402 may be "Tom Cruise", the second object 404 may be "Yakiniku", the third object 406 may be "Notre dame Cathedral", and the fourth object may be "Die Hard 2". Although only four objects are illustrated in the index 128, it should be understood that the index 128 may comprise more or fewer than four objects.

Each of the objects is associated with information data. The first object 402 is associated with first information data 410, the second object 404 is associated with second information data 412, the third object 406 is associated with third information data 414 and the fourth object 408 is associated with fourth information data 416. In some embodiments, the information data may include a high-level description of the object it is associated with (described below).

In some embodiments, the information data further comprises an indication of a web source (such as the URL) associated with the object. For example, the first information data 410 may comprise a first URL 418, which is related to the Wikipedia™ page of "Tom Cruise", and the second information data 412 may comprise a second URL 420, which is also related to the Wikipedia™ page of "Yakiniku", and so on.

In some embodiments, the information data corresponds to information retrieved from the web resource associated with the object. For example, the information data may correspond to the first paragraph of the Wikipedia™ page of "Tom Cruise" accessed via the first URL 418.

The manner in which the index 128 is populated is not limited, and may for example be manually populated by an administrator of the object database 126.

With continued reference to FIG. 1, the server 116 is further coupled to a log database 130 via a dedicated link (not numbered). In alternative implementations, the log database 130 may be communicatively coupled to the server 116 via the communication network 114 without departing from the teachings of the present technology. Although the log database 130 is illustrated schematically herein as a single entity, it is contemplated that the log database 130 may be configured in a distributed manner.

The log database 130 is configured to store previously collected data associated with one or more electronic devices. In some non-limiting embodiments, the log database comprises a search history log 134 and a web browsing log 132.

Generally speaking, the "search strings" which one or more users input into a search query interface of the plurality of electronic device for executing a search with search engine applications such as Google™, or Yandex™ (not shown) are stored within the search history log 134. As such, the log database 130 may be coupled to a search engine server (not depicted).

On the other hand, the web browsing log 132 stores web browsing history data (described below) by the one or more electronic devices when navigating the web.

The manner in which the web browsing log 132 is populated is not limited. For example, the log database 130 may be coupled to a web server (not depicted) configured to execute (or otherwise has access) to a web analytic application such as, for example, Yandex.Metrica™ or Google Analytics™. The manner in which the web analytic application is implemented is generally known, and therefore will not be described at length herein. Suffice to say that the web analytic application is configured to track and store the browsing history data associated with the one or more electronic devices (not shown), within the web browsing log 132.

Examples of browsing history data that can be stored within the web browsing log 132 includes, but not limited to:
  An indication of a unique browser ID associated with the browser application accessing the web server;
  URLs of the accessed web resources hosted in the web server or any other web servers (not depicted) serviced by the web analytic application; and
  An access time when the web resources were accessed (i.e. a time stamp).

The manner in which the browsing history data is collected by the web analytic application is well known, and will not be described herein.

In some non-limiting embodiments, in addition to, or instead of, populating the web browsing log 132 with the browsing history data received from the web analytic application, it is contemplated that the browsing history data can be received directly from the browser application 108, when for example, accessing the news aggregator application 122. In these embodiments of the present technology, the browsing history data can be rendered anonymous by disassociating the browsing data from any identifiers of the user of the browser application 108.

Figure 6:
FIG. 6 depicts a schematic illustration of a navigational history data stored within the log database of the system of FIG. 1.

With reference to FIG. 6, there is depicted a non-limiting example of the web browsing log 132 from the browser application 108. The web browsing log 132 consists of (i) the access time 602 for the web resources accessed by the browser application 108; and (ii) a set of URLs 604 for each of the web resources sorted chronologically based on their respective access time 602. Although the web browsing log 132 is depicted as only comprising the access time 602 and the set of URLs 604, it is not limited as such, and may further include other information received by the web analytic application (not depicted) and/or the electronic device 102.

As illustrated, it is shown that the browser application 108 (which is associated with a unique browser ID 606) has accessed at least 14 web resources in a given period of time.

It should be expressly understood that although the web browsing log 132 as currently illustrated contains only the browsing history data associated with the browser application 108 of the electronic device 102, it is not limited as such, and it is contemplated that the web browsing log 132 contains the browsing history data associated with a plurality of electronic devices (not depicted).

News Aggregator Application 122

Figure 5:
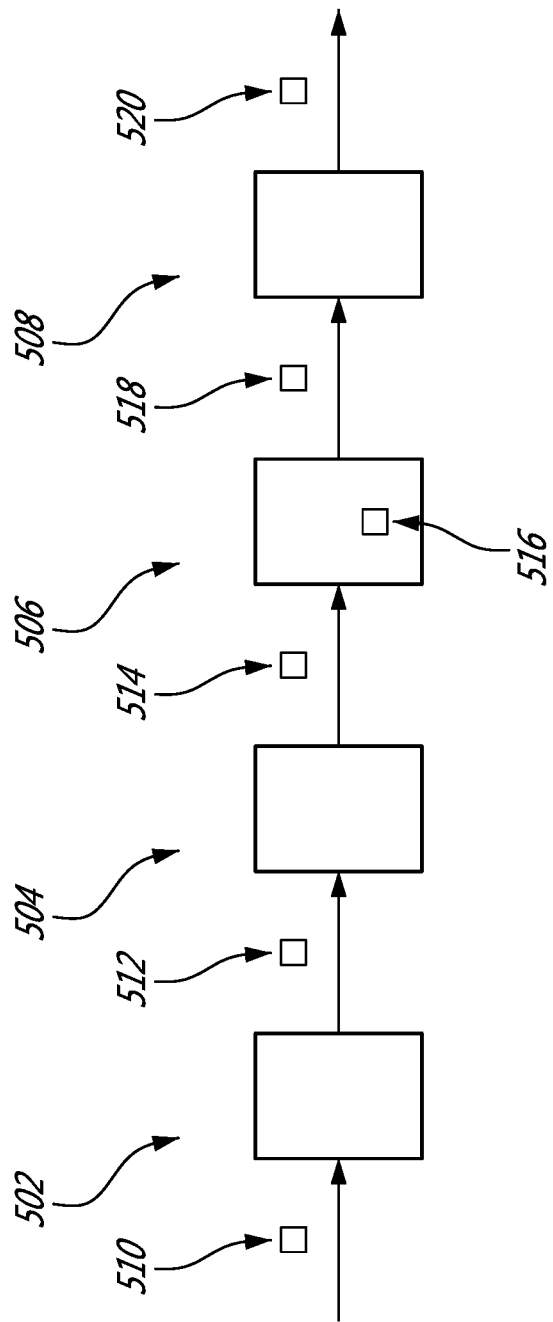
FIG. 5 depicts an example of a process of generating an object card.

With reference to FIG. 5, there is depicted a schematic illustration of an operation of the news aggregator application 122 being implemented in accordance with non-limiting embodiments of the present technology. The news aggregator application 122 executes (or otherwise has access to): a receiving routine 502, a parsing routine 504, a ranking routine 506 and a card generation routine 508.

In the context of the present specification, the term "routine" refers to a subset of the computer executable program instructions of the news aggregator application 122 that is executable by the server processor 120 to perform the functions explained below in association with the various routines (the receiving routine 502, the parsing routine 504, the ranking routine 506 and the card generation routine 508). For the avoidance of any doubt, it should be expressly understood that the receiving routine 502, the parsing routine 504, the ranking routine 506 and the card generation routine 508 are illustrated schematically herein as separate entities for ease of explanation of the processes executed by the news aggregator application 122. It is contemplated that some or all of the receiving routine 502, the parsing routine 504, the ranking routine 506 and the card generation routine 508 may be implemented as one or more combined routines.

For ease of understanding the present technology, functionality of each one of the receiving routine 502, the parsing routine 504, the ranking routine 506 and the card generation routine 508, as well as data and/or information processed or stored therein are described below.

Receiving Routine 502

The receiving routine 502 is configured to receive a data packet 510 from the electronic device 102. The data packet 510 comprises a request for a digital document (such as the digital document 206). In some implementations, the data packet 510 further comprises the unique browser ID 606 associated with the browser application 108. The manner in which the data packet 510 is transmitted by the electronic device 102 is not limited, and may for example be in response to the electronic device 102 accessing the news aggregator application 122 via the communication network 114 and selecting the digital document 206 for viewing.

The receiving routine 502 is configured to access the news database 124 and retrieve the requested digital document 206.

Parsing Routine 504

Once the digital document 206 has been retrieved from the news database 124, the receiving routine 502 is configured to transmit a data packet 512 to the parsing routine 504. The data packet 512 comprises the digital document 206. In some implementations, the data packet 510 further comprises the unique browser ID 606.

The parsing routine 504 is configured to execute the following functions. First the parsing routine 504 is configured to analyze the content of the digital document 206 to identify the presence of any objects stored within the object database 126 (see FIG. 4). In other words, the parsing routine 504 is configured to cross-reference the objects present in the index 128 to identify the one or more objects present within the digital text 302 (see FIG. 3).

Within the digital text 302, the parsing routine 504 has identified a first text object 308 (which corresponds to the first object 402) and a second text object 310 (which corresponds to the second object 404). Needless to say, it is contemplated that the parsing routine 504 may identify more or less objects within the digital text 302.

Ranking Routine 506

Once the objects present in the digital text 302 have been identified, the parsing routine 504 is configured to transmit a data packet 514 to the ranking routine 506. The data packet 514 comprises the first text object 308 and the second text object 310. In some implementations, the data packet 514 further comprises the unique browser ID 606.

The ranking routine 506 may execute the following functions.

Firstly the ranking routine 506 is configured to determine a set of features associated with each of the first text object 308 and the second text object 310. The set of features is indicative of one or more characteristics of the first text object 308 and the second text object 310 respectively. In some embodiments, the set of features may include at least one of three types of features, namely a (i) set of profile features associated with the text object (described below), (ii) a popularity feature associated with the text object (described below), and (iii) a set of statistical features associated with the text object (described below).

The ranking routine 506 is configured to determine a first set of profile features associated with the first text object 308 and a second set of profile features associated with the second text object 310. How the first set of profile features and the second set of profile features are implemented is not limited, and may for example be a set of vectors representing the profile of the first text object 308 and the second text object 310 respectively.

The manner in which the first set of profile features and the second set of profile features are determined is not limited. For example, the ranking routine 506 may access the index 128 (see FIG. 4) and further access the URLs associated with each of the first text object 308 (i.e. the first URL 418 associated with the first object 402 "Tom Cruise") and the second text object 310 (i.e. the second URL 420 associated with the second object 404 "Yakiniku"). The ranking routine 506 may further be configured to analyze the content of the associated webpages, and generate the first set of profile features and the second set of profile features by using a machine learning algorithm (not depicted). For example, the machine learning algorithm may take into consideration a category, a profession, a country of origin, and other type of information associated with the first text object 308 and the second text object 310

Once the first set of profile features and the second set of profile features are determined, the ranking routine 506 is further configured to access the search history log 134 and determine a popularity feature to each of the first text object 308 and the second text object 310. In some embodiments, the popularity feature is indicative of a number of searches made using the first text object 308 and the second text object 310 as a "search string" during a predetermined period of time, such as the past 10 days, the past 24 hours, and the like, within the search history log 134 In some embodiments, it is further contemplated that the ranking routine 506 has access to a vertical search history log (not depicted), which comprises search strings which one or more users input into the search query interface of the plurality of electronic device for executing a vertical search with vertical search engine applications such as Yandex.Images™, Yandex.Video™, Youtube™, and the like. As such, the first set of profile features and the second set of profile features is indicative of a number of searches made using the first text object 308 and the second text object 310 as a "search string" during a predetermined period of time, within the vertical search history log.

Finally, the ranking routine 506 is configured to determine, for each of the first text object 308 and the second text object 310, a set of statistical features. In accordance with the present technology, the set of statistical features may comprise statistical characteristics that are associated with each of the text object within at least one of (i) the digital text 302 and/or (ii) the plurality of digital documents included within the one or more topic clusters 202 (see FIG. 2).

Just as an example, the set of statistical features for the first text object 308 may include:
A number of occurrences of the first text object 308 within the digital text 302;
A size (determined based on a number of words) of the digital text 302;
An average number of occurrences of the first text object 308 within the plurality of digital documents present in the one or more topic clusters 202; and
A number of digital documents within the first topic cluster 204 comprising the first text object 308.

The ranking routine 506 is further configured to execute a MLA 516 trained to generate a score value to each of the first text object 308 and the second text object 310 based on the (i) set of profile features, and/or (ii) the popularity features, and/or (iii) the set of statistical features associated with the first text object 308 and the second text object 310.

The manner in which the ranking score is implemented is not limited, and may for example be representative of a likelihood of the user associated with the electronic device 102 to execute a web search (via a search engine) to locate additional information in respect to the first text object 308 and the second text object 310, within a pre-determined period of time after being exposed to the digital document 206.

More precisely, the MLA 516 is trained to assign, for each of the first text object 308 and second text object 310, either one of (i) a first ranking score which represents a higher likelihood of the user executing a web search to locate additional information, and (ii) a second ranking score which represents a lower likelihood of the user executing a web search to locate additional information. In some embodiments, the first ranking score and the second ranking score may be expressed as a binary value, where the first ranking score is 1, and the second ranking score is 0. Needless to say, both the first ranking score and the second ranking score may be expressed in a number of different formats.

Training the MLA 516

Figure 7:
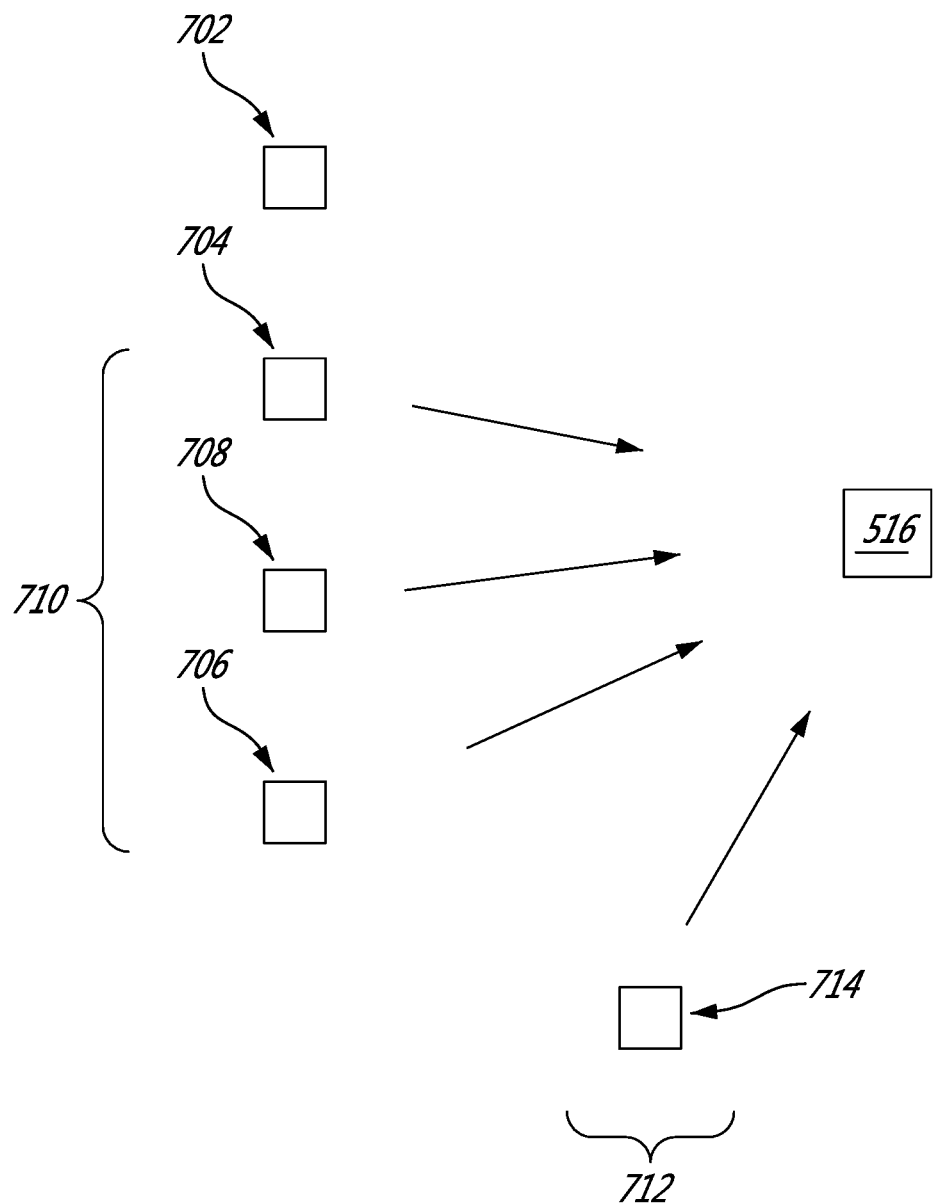
FIG. 7 depicts a schematic diagram of training a machine learning algorithm of FIG. 5.

With reference to FIG. 7, a schematic illustration on the training of the MLA 516 is depicted.

For simplicity, the training of the MLA 516 will be explained with regards to a single training object. However, it should be understood that the MLA 516 can be trained on more than a single training object.

For understanding the underlying concepts of the present technology, it should be understood that the training of the MLA 516 can be broadly separated into a first phase, a second phrase and a third phase. In the first phase, the training input data (discussed below) is generated. In the second phase, the training output data (discussed below) is generated. At a third phase, the MLA 516 is trained using the training input data and the training output data. Moreover, although the steps of training the MLA 516 is explained as being executed by the ranking routine 506, it is not limited as such.

In the first phase, a training object 702 corresponding to an object stored within the index 128 is acquired. How the training object 702 is acquired is not limited, and for example, may be received by an administrator of the news aggregator application 122. For the purpose of explanation, let us assume that the training object 702 corresponds to "Charles Schulz", the American cartoonist.

The ranking routine 506 is then configured to determine the training input data 710. The training input data 710 comprises (i) a training set of profile features 704, and/or (ii) a training popularity feature 706, and/or (iii) a training set of statistical features 708 associated with the training object 702. The manner in which the training set of profile features 704, the training popularity feature 706 and the training set of statistical features 708 are determined is not limited, and may for example be determined substantially the same manner as explained above.

Having determined the training input data 710, the ranking routine 506 is configured to determine the training output data 712. The training output data 712 comprises a label 714 associated with the training object 702.

The manner in which the label 714 is determined will now be explained. In some implementations, the label 714 is indicative of a number of navigational session transition patterns (described below) comprising a web page associated with a digital news article comprising the training object 702 and a search engine result page comprising the training object 702 as a search term.

In some implementations, the label 714 is indicative of a ratio of a number of the navigational session transition patterns that include a web page associated with the digital news article that mentions the training object 702 and a search engine result page that was generated with the training object 702 as a search term, with regards to a given total number of navigational session transition patterns present in the web browsing log 132, The manner in which the label 714 is determined is not limited. For example, the ranking routine 506 may be configured to access the web browsing log 132 of the browser application 108 (see FIG. 6), and sort the set of URLs 604 chronologically, and parse the URLs forming the set of URLs 604, into one or more navigational session transition patterns. In some non-limiting embodiments of the present technology, the navigational session transition pattern is indicative of the interactions made within a browsing session defined by a period of time starting with a connection to the communication network 114 by the browser application 108 for the purpose of browsing the Internet, and terminating a with a disconnection from the communication network (for example, by means of closing the browser application 108). As such, the manner in which the parsing of the set of URLs 604 is done is not limited, and may be done by any manner, such as by grouping URLs having a similar access time or having been accessed in a predefined time interval (such as applying a predetermined time period mask, such as 10 minutes, to the set of URLs 604).

Referring to FIG. 8, there is depicted a set of navigational session transition patterns (a first navigational session transition pattern 802, a second navigational session transition pattern 812, a third navigational session transition pattern 814, a fourth navigational session transition pattern 816, and a fifth navigational session transition pattern 818). The first navigational session transition pattern 802 comprises a subset of URLs of the set of URLs 604 determined to belong to the same navigational session transition pattern as a result of the parsing. As such, the first navigational session transition pattern 802 includes a first URL 804, a second URL 806, a third URL 808 and a fourth URL 810.

Taking the first navigational session transition pattern 802 as an example, let us assume that the URLs contained therein are the following:

TABLE 1

| | |
|---|---|
| First URL 804 | www.news.yandex.ru |
| Second URL 806 | www.cnn.com/Showbiz/schulz . . . |
| Third URL 808 | www.yandex.com |
| Fourth URL 810 | www.yandex.com/search/text=charles-schulz . . . |

The ranking routine 506 is configured to access the news websites contained within the first navigational session transition pattern 802 (such as the second URL 806 associated with CNN™), and determine if the training object 702 is present within the digital article associated with the second URL 806.

If the training object 702 is present within the digital article associated with the second URL 806, the ranking routine 506 is configured to determine if following a predetermined time period or web pages accessed after the second URL 806, there is a search engine result page comprising the training object 702 as the search term (such as the fourth URL 810).

In the present example, the fourth URL 810 is a search engine result page in which the training object 702 has been used as a search term. As such, the ranking routine 506 determines that the first navigational session transition pattern 802 comprises a web page associated with a digital news article comprising the training object 702 and a search engine result page comprising the training object 702 as a search term.

The ranking routine 506 is further configured to execute the above functions with regards to the remaining navigational sessions (such as the second navigational session transition pattern 812, the third navigational session transition pattern 814, the fourth navigational session transition pattern 816 and the fifth navigational session transition pattern 818), to determine a total number of occurrences in which the navigational session transition patterns comprises a web page associated with a digital news article comprising the training object 702 and a search engine result page comprising the training object 702 as a search term. Assuming that only the first navigational session transition pattern 802 (out of the five navigational session transition patterns) comprises a web page containing the digital news article displaying the training object 702 and a search engine result page that was generated using the training object 702 as a search term, the label 714 corresponds to 0.20 (or ⅕). In accordance with some of the non-limiting embodiments of the present technology, the higher the value of the label 714 is, the higher the likelihood that a given user may find an object card in regard to the training object 702 useful. In accordance with the non-limiting embodiments of the present technology, based on the higher the likelihood, a determination may be made to display the object card, which may ameliorate the necessity for the given user to perform additional searches should the given user be interested to get additional information about the object.

Although the determination of the label 714 has been made only with reference to the web browsing log 132 associated with the browser application 108 of the electronic device 102, it is not limited as such. Indeed, it is contemplated that the label 714 be determined based on any browsing log stored within the log database 130, associated with a plurality of electronic devices.

Returning to FIG. 7, the training input data 710 and the training output data 712 (i.e. the label 714) is inputted into the MLA 516 for training. In some embodiments, the MLA 516 is a neural network. The MLA 516 comprises a training logic to determine a set of features associated with the training input data 710 and the training output data 712. Based on the set of features associated with the training input data 710 and the training output data 712, the MLA 516 is configured to learn a training score value being indicative of one of a higher degree of likelihood or a lower degree of likelihood of the user executing a web search to locate additional information in respect to the training object 702.

In some implementations, the MLA 516 may be configured to learn a training score value that is user-specific, meaning that the score value is indicative of the likelihood of the user associated with the browser application 108 to execute additional searches with regards to the first text object 308 and the second text object 310. It would be understood that the MLA 516 would then be trained solely on the web browsing log 132 associated with the browser application 108, and would require the unique browser ID 606 as an additional input data.

In other implementations, the MLA 516 may be configured to learn a training score value is non-user-specific, meaning that the score value is indicative of the likelihood of any given user to execute additional searches with regards to the first text object 308 and the second text object 310. It would be understood that the MLA 516 would be training on web browsing logs associated with a plurality of electronic devices.

Needless to say, although there is only depicted a single instance of the training the MLA 516, it is done so for ease of illustration. It should be expressly understood that the training of the MLA 516 is done iteratively using a plurality of different training objects.

In-Use Phase

Returning to FIG. 5, the explanation on how the score values for the first text object 308 and the second text object 310 is determined is resumed.

The MLA 516 is configured to assign a respective score value to the first text object 308 and the second text object 310 based on the set of features, namely: (i) the set of profile features, and/or (ii) the popularity features, and/or (iii) the set of statistical features associated with the first text object 308 and the second text object 310, and/or (iv) the unique browser ID 606.

Card Generation Routine 508

Having determined the score values to the first text object 308 and the second text object 310, the ranking routine 506 is configured to transmit a data packet 518 to the card generation routine 508. The data packet 518 comprises the first text object 308, the second text object 310 and the respective score values.

Let us assume, that the first text object 308 is assigned a score value of 1, meaning that there is a high likelihood of the user executing a web search to locate additional information associated with the first text object 308. On the other hand, the second text object 310 is assigned a score value of 0, meaning that there is a low likelihood of the user executing a web search to locate additional information. Again, it should be understood that the score value may be represented in a different manner, such as a range (from 0 to 10), a percentage, or the like.

The card generation routine 508 is configured to compare the score values of the first text object 308 and the second text object 310 against a threshold value. The manner in which the threshold value is determined is not determined, and may be determined empirically. In the present case, the threshold value is 0.5.

In the present example, since only the first text object 308 has been assigned a score value above the threshold value, the card generation routine 508 is configured to generate an object card (described below), associated with the first text object 308. In some embodiments, the object card comprises an indication of the first text object 308, the first information data 410 (see FIG. 4) associated with the first object 402, as well as the first URL 418.

Having generated the object card, the card generation routine 508 is configured to transmit a data packet 520 to the electronic device 102. The data packet 520 comprises the previously requested digital document (such as the digital document 206) and the object card for display on the electronic device 102.

Figure 9:
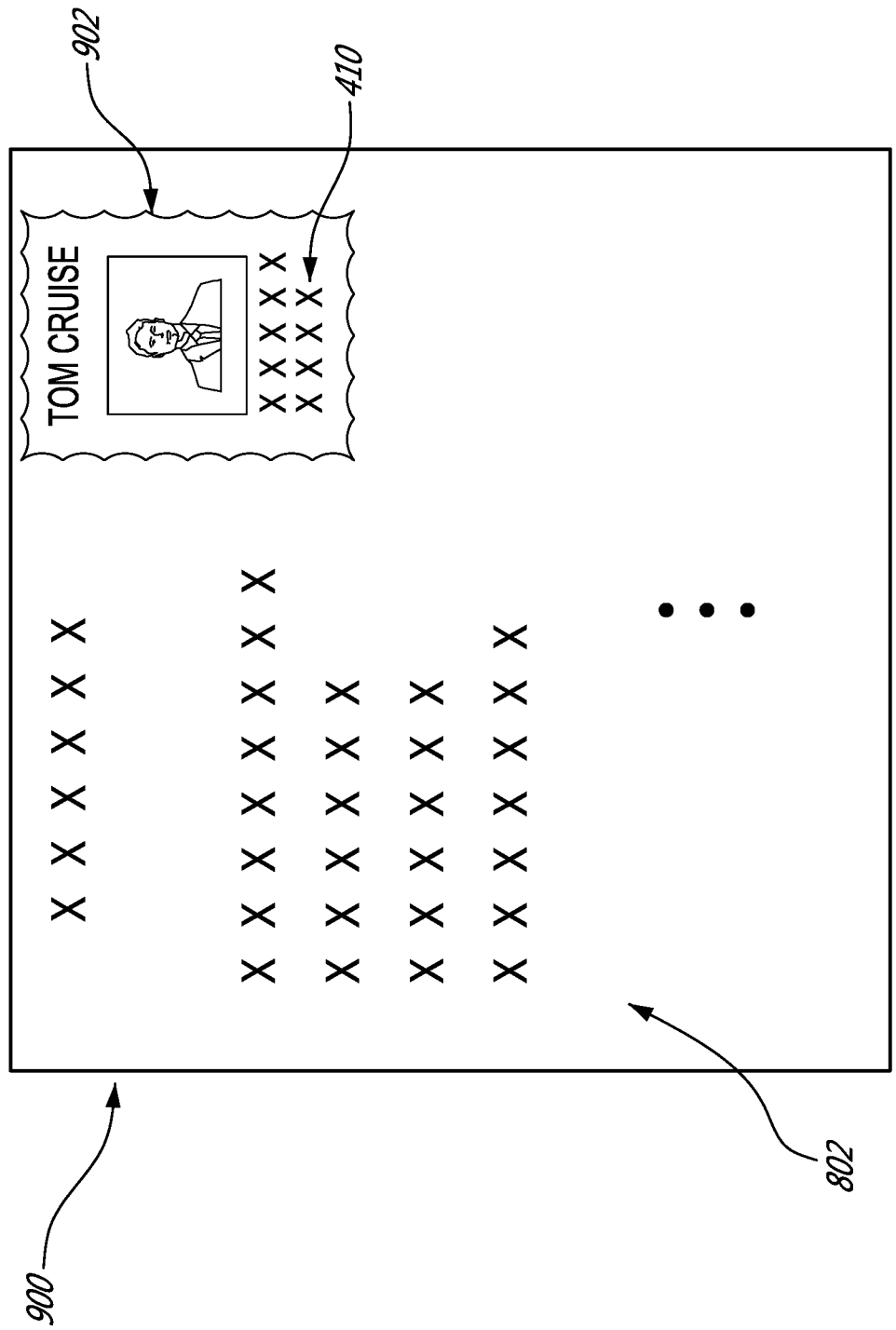
FIG. 9 depicts a screenshot of the digital document displayed on an electronic device of the system of FIG. 1.

Referring now to FIG. 9, there is provided a screenshot 900 of the digital document 206, displaying the digital text 302 on the electronic device. The digital document 206 further includes the object card 902. The object card 902 comprises an indication of the first text object 308, the first information data 410, and in some embodiments, a picture retrieved from the first URL 418. In some embodiments the object card 902 comprises an embedded link to the first URL 418, such that if the user clicks on any portion of the object card 902, the user is directed to a webpage associated with the first URL 418. Needless to say, instead of displaying a picture within the object card 902, it is contemplated that the object card may include a video associated with the first text object 308 retrieved from the first URL 418.

Naturally, the object card 902 may contain other types of data, without departing from the scope of the present technology.

In some implementations, the object card 902 is not displayed next to the digital document 206 as shown in FIG. 9, but is configured to be displayable in response to the user interacting with the first text object 308, such as hovering, clicking, and the like. As such, it is contemplated that the first text object 308 can be displayed with emphasis (such as highlighted, underlined, bolded, and the like) within the digital text 302.

Figure 10:
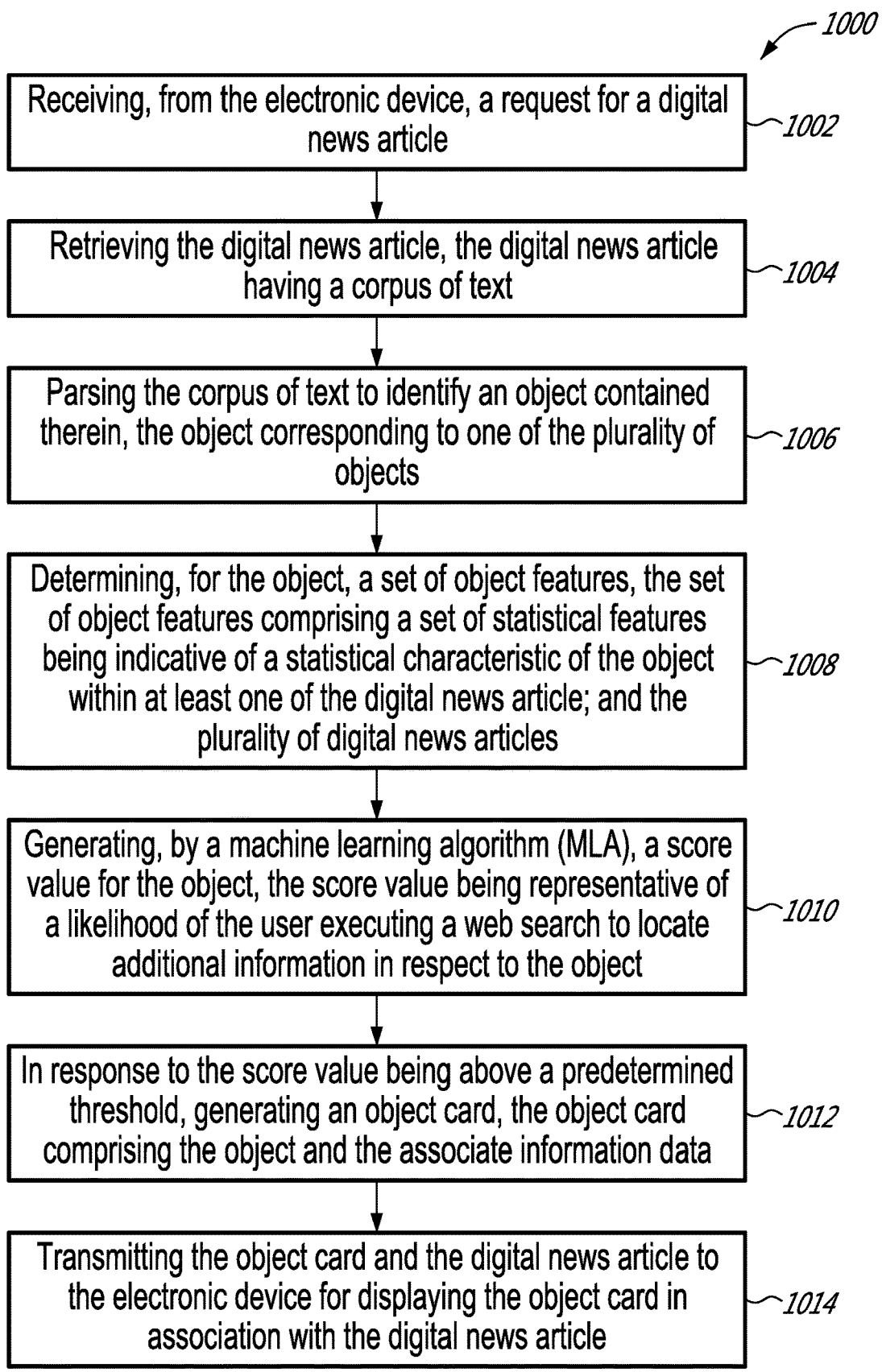
FIG. 10 depicts a block diagram of a flow chart of a method for generating an object card.

Given the architecture and examples provided herein above, it is possible to execute a computer-implemented method of generating an object card. With reference to FIG. 10, there is provided a flow chart of a method 1000, the method 1000 being executable in accordance with non-limiting embodiments of the present technology. The method 1000 can be executed by the server 116.

Step 1002: Receiving, from the Electronic Device, a Request for a Digital News Article The method 1000 starts at step 1002, where the receiving routine 502 acquires the data packet 510 from the electronic device 102, which comprises a request for the digital document 206. The manner in which the data packet 510 is transmitted by the electronic device 102 is not limited, and may for example be in response to the electronic device 102 accessing the news aggregator application 122 via the communication network 114 and selecting the digital document 206 for viewing.

Step 1004: Retrieving the Digital News Article, the Digital News Article Having a Corpus of Text At step 1004, the receiving routine 502 is configured to access the news database 124 and retrieve the requested digital document 206.

Step 1006: Parsing the Corpus of Text to Identify an Object Contained Therein, the Object Corresponding to One of the Plurality of Objects At step 1006, the receiving routine 502 is configured to transmit the data packet 512 to the parsing routine 504. The data packet 512 comprises the digital document 206.

The parsing routine 504 is configured to analyze the content of the digital document 206 to identify the presence of any objects stored within the object database 126.

Step 1008: Determining, for the Object, a Set of Object Features, the Set of Object Features Comprising a Set of Statistical Features being Indicative of a Statistical Characteristic of the Object within at Least One of: The Digital News Article and the Plurality of Digital News Articles At step 1008, the parsing routine 504 is configured to transmit the data packet 514 to the ranking routine 506, which comprises the first text object 308 that has been identified by the parsing routine 504.

The ranking routine 506 is configured to determine a set of features associated with the first text object 308. The set of features comprises: (i) the set of profile features, and/or (ii) the popularity feature, and/or (iii) the set of statistical features associated with the first text object 308.

Just as an example, the set of statistical features for the first text object 308 may include:

A number of occurrences of the first text object 308 within the digital text 302;

A size (determined based on a number of words) of the digital text 302;

An average number of occurrences of the first text object 308 within the plurality of digital documents present in the one or more topic clusters 202; and A number of digital documents within the first topic cluster 204 comprising the first text object 308.

Step 1010: Generating, by a Machine Learning Algorithm (MLA), a Score Value for the Object, the Score Value being Representative of a Likelihood of the User Executing a Web Search to Locate Additional Information in Respect to the Object Having determined the set of statistical features associated with the first text object 308, the ranking routine 506 is configured to input the set of statistical features into the MLA 516 to generate the score value associated with the first text object 308.

More precisely, the MLA 516 is trained to assign, for each of the first text object 308 and second text object 310, either one of (i) a first ranking score which represents a high likelihood of the user executing a web search to locate additional information, and (ii) a second ranking score which represents a low likelihood of the user executing a web search to locate additional information. In some embodiments, the first ranking score and the second ranking score may be expressed as a binary value, where the first ranking score is 1, and the second ranking score is 0. Needless to say, both the first ranking score and the second ranking score may be expressed in a number of different formats.

Step 1012: In Response to the Score Value being Above a Predetermined Threshold, Generating an Object Card, the Object Card Comprising the Object and the Associate Information Data Having determined the score values to the first text object 308, the ranking routine 506 is configured to transmit the data packet 518 to the card generation routine 508. The data packet 518 comprises the first text object 308 and its score value.

The card generation routine 508 is configured to compare the score value associated with the first text object 308 to a predefined threshold value. If the score value is above the threshold value, it is further configured to generate the object card 902.

The object card 902 comprises an indication of the first text object 308, the first information data 410, and in some embodiments, a picture retrieved from the first URL 418. In some embodiments the object card 902 comprises an embedded link to the first URL 418, such that if the user clicks on any portion of the object card 902, the user is directed to a webpage associated with the first URL.

Step 1014: Transmitting the Object Card and the Digital News Article to the Electronic Device for Displaying the Object Card in Association with the Digital News Article Having generated the object card, the card generation routine 508 is configured to transmit the data packet 520 to the electronic device 102. The data packet 520 comprises the previously requested digital document (such as the digital document 206) and the object card for display on the electronic device 102.

It should be apparent to those skilled in the art that at least some embodiments of the present technology aim to expand a range of technical solutions for addressing a particular technical problem encountered by the conventional news aggregator systems, namely providing for display additional information on objects that the user may desire to learn more about.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

While the above-described implementations have been described and shown with reference to particular steps performed in a particular order, it will be understood that these steps may be combined, sub-divided, or re-ordered without departing from the teachings of the present technology. Accordingly, the order and grouping of the steps is not a limitation of the present technology.

The invention claimed is:

1. A computer-implemented method for generating an object card, the method being executed by a server connectable to an electronic device associated with a user via a communication network, the server being further coupled to:
    a news database comprising a plurality of digital news articles, each of the digital news article having been previously crawled from a respective web resource and comprising an original corpus of text;
    an object database, the object database hosting an indication of:
        a plurality of objects; and
        information data associated with each of the plurality of objects;
    the method comprising:
        receiving, from the electronic device, a request for a digital news article;
        retrieving the digital news article, the digital news article having a respective original corpus of text;
        parsing the corpus of text to identify an object contained therein, the object corresponding to one of the plurality of objects;
        determining, for the object, a set of object features, the set of object features comprising a set of statistical features being indicative of a statistical characteristic of the object within at least one of:
            the digital news article; and
            the plurality of digital news articles;
        generating, by a machine learning algorithm (MLA), a score value for the object, the score value being representative of a likelihood of the user executing a web search to locate additional information in respect to the object;
        in response to the score value being above a predetermined threshold, generating an object card, the object card comprising the object and the associate information data;
        transmitting the object card and the digital news article to the electronic device for displaying the object card in association with the digital news article with the original corpus of text.

2. The method of claim 1, wherein
    the MLA is a neural network; and
    the method further comprises training the neural network using a training set of data prior to receiving the request for the digital news article.

3. The method of claim 2, wherein the server is further coupled to:
    a browsing log, the browsing log storing an indication of a plurality of navigational session transition patterns, each of the navigational session transition patterns having one or more web pages accessed by a given electronic device; and
    the training sets of data comprising at least:
        a training set of object features associated with a training object;
        a label associated with the training object, the label being indicative of a number of navigational session transition patterns, each of the navigational session transition patterns comprising a first web page associated with a training digital news article comprising the training object, and a second web page associated with a search engine result page comprising the training object as a search term.

4. The method of claim 3, wherein
the training set of object features comprises a training set of statistical features being indicative of the statistical characteristics of the training object within at least one of the digital news article and the plurality of digital news articles; and
the label comprises a ratio of the number of navigational session transition patterns with regards to the plurality of navigational session transition patterns.

5. The method of claim 3, wherein the first web page and the second web page have been accessed within a predetermined time period within each of the number of navigational session transition patterns.

6. The method of claim 5, wherein the training the neural network comprises:
inputting the training set of object features associated with the training object as an input data;
inputting the label associated with the training object;
determining, for the set of object features and the label, a set of features representative of a property of the training object; and
based on the set of features of the training object, learning a training score value, the training score value being indicative of one of a higher degree of likelihood or a lower degree of likelihood of the user executing a web search to locate additional information in respect to the training object after being exposed to the training article.

7. The method of claim 3, wherein:
the electronic device is associated with a user ID;
each of the number of navigational session transition patterns is associated with the user ID; and
the score value being representative of a respective likelihood of the user associated with the electronic device executing the web search to locate additional information in respect to the object.

8. The method of claim 1, wherein the set of statistical features comprises at least one of:
a number of occurrence of the indication of the object within the digital news article;
a size of the corpus of text;
an average number of objects present in each of the plurality of digital news articles; and
the set of object features further comprises at least one of:
a set of profile features associated with the object, the profile feature being a set of vectors representing the profile of the text object; and
a popularity feature, the popularity feature being indicative of a popularity of the object as a search term in a search engine service.

9. The method of claim 8, wherein:
the set of profile features is generated by analyzing a webpage associated with the object; and
the popularity feature is generated by analyzing one of a search history log and a vertical search history log associated with the search engine service.

10. The method of claim 8, the method further comprising:
parsing the plurality of digital news articles by topic;
identifying a subset of the plurality of digital news articles sharing a same topic with the digital news article; and
wherein the set of object features of the object further comprises at least one of:

a number of digital news articles within the subset comprising the object.

11. The method of claim 1, wherein the information data is at least one of:
an image;
a text; and
a video.

12. A system for generating an object card, the system comprising a server connectable to:
an electronic device associated with a user via a communication network;
a news database comprising a plurality of digital news articles, each of the digital news article having been previously crawled from a respective web resource and comprising an original corpus of text;
an object database, the object database hosting an indication of:
a plurality of objects; and
information data associated with each of the plurality of objects;
the server comprising a processor configured to:
receive, from the electronic device, a request for a digital news article;
retrieve the digital news article, the digital news article having a respective original corpus of text;
parse the corpus of text to identify an object contained therein, the object corresponding to one of the plurality of objects;
determine, for the object, a set of object features, the set of object features comprising a set of statistical features being indicative of a statistical characteristic of the object within at least one of:
the digital news article; and
the plurality of digital news articles;
generate, by a machine learning algorithm (MLA), a score value for the object, the score value being representative of a likelihood of the user executing a web search to locate additional information in respect to the object;
in response to the score value being above a predetermined threshold, generate an object card, the object card comprising the object and the associate information data;
transmit the object card and the digital news article to the electronic device for displaying the object card in association with the digital news article with the original corpus of text.

13. The system of claim 12, wherein
the MLA is a neural network; and
the processor is further configured to train the neural network using a training set of data prior to receiving the request for the digital news article.

14. The system of claim 13, wherein the server is further coupled to:
a browsing log, the browsing log storing an indication of a plurality of navigational session transition patterns, each of the navigational session transition patterns having one or more web pages accessed by a given electronic device; and
the training sets of data comprising at least:
a training set of object features associated with a training object;
a label associated with the training object, the label being indicative of a number of navigational session transition patterns, each of the navigational session transition patterns comprising a first web page associated with a training digital news article comprising the training object, and a second web page associated with a search engine result page comprising the training object as a search term.

15. The system of claim 14, wherein
the training set of object features comprises a training set of statistical features being indicative of the statistical characteristics of the training object within at least one of the digital news article and the plurality of digital news articles; and
the label comprises a ratio of the number of navigational session transition patterns with regards to the plurality of navigational session transition patterns.

16. The system of claim 14, wherein the first web page and the second web page have been accessed within a pre-determined time period within each of the number of navigational session transition patterns.

17. The system of claim 16, wherein to train the neural network, the processor is configured to:
input the training set of object features associated with the training object as an input data;
input the label associated with the training object; determining, for the set of object features and the label, a set of features representative of a property of the training object; and
based on the set of features of the training object, learn a training score value, the training score value being indicative of one of a higher degree of likelihood or a lower degree of likelihood of the user executing a web search to locate additional information in respect to the training object after being exposed to the training article.

18. The system of claim 14, wherein:
the electronic device is associated with a user ID;
each of the number of navigational session transition patterns is associated with the user ID; and
the score value being representative of a respective likelihood of the user associated with the electronic device executing the web search to locate additional information in respect to the object.

19. The system of claim 12, wherein the set of statistical features comprises at least one of:
a number of occurrence of the indication of the object within the digital news article;
a size of the corpus of text;
an average number of objects present in each of the plurality of digital news articles; and
the set of object features further comprises at least one of:
a set of profile features associated with the object, the profile feature being a set of vectors representing the profile of the text object; and
a popularity feature, the popularity feature being indicative of a popularity of the object as a search term in a search engine service.

20. The system of claim 18, wherein:
the set of profile features being generated by analyzing a webpage associated with the object; and
the popularity feature is generated by analyzing one of a search history log and a vertical search history log associated with the search engine service.

21. The system of claim 19, wherein the processor is further configured to:
parse the plurality of digital news articles by topic;
identify a subset of the plurality of digital news articles sharing a same topic with the digital news article; and
wherein the set of object features of the object further comprises at least one of:
a number of digital news articles within the subset comprising the object.

* * * * *